United States Patent [19]
Halm et al.

[11] Patent Number: 5,858,070
[45] Date of Patent: Jan. 12, 1999

[54] APPARATUS FOR CLEANING A HYDRAULIC FLUID

[75] Inventors: Juergen Halm, Ganderkesee; Jochen Mertens, Bassum; Manfred Becher, Dreieich, all of Germany

[73] Assignee: Daimler-Benz Aerospace Airbus GmbH, Hamburg, Germany

[21] Appl. No.: 892,419

[22] Filed: Jul. 14, 1997

[51] Int. Cl.$^6$ .................................. B01D 19/00
[52] U.S. Cl. .............................. 95/248; 95/261; 96/156; 96/170; 96/171; 96/172; 96/187; 96/189; 96/196; 96/214
[58] Field of Search .................. 95/241, 247, 248, 95/261, 266; 55/356; 96/156, 157, 158, 170, 171, 172, 188, 189, 187, 195, 196, 208, 214, 216

[56] References Cited

U.S. PATENT DOCUMENTS

| | | | |
|---|---|---|---|
| 2,443,875 | 6/1948 | Spangenberger | 96/195 |
| 2,725,956 | 12/1955 | Cunningham | 96/187 |
| 3,053,233 | 9/1962 | Mead | 96/214 |
| 3,112,190 | 11/1963 | Topol | 95/266 |
| 3,157,478 | 11/1964 | Edwards | 95/261 |
| 3,339,345 | 9/1967 | Sebald et al. | 96/157 |
| 3,339,346 | 9/1967 | Buchanan | 55/356 |
| 3,497,034 | 2/1970 | Eddy, Jr. | 96/156 |
| 3,561,193 | 2/1971 | Baranowski | 95/266 |
| 4,604,109 | 8/1986 | Koslow | 96/196 |
| 5,039,425 | 8/1991 | Caris et al. | 95/261 |
| 5,314,613 | 5/1994 | Russo | 95/266 |
| 5,494,501 | 2/1996 | Anspach et al. | 96/208 |

FOREIGN PATENT DOCUMENTS

| | | | |
|---|---|---|---|
| 2001653 | 10/1993 | Russian Federation | 96/196 |
| 980760 | 12/1982 | U.S.S.R. | 96/195 |
| 1526741 | 12/1989 | U.S.S.R. | 96/266 |
| 1611373 | 12/1990 | U.S.S.R. | 96/195 |

*Primary Examiner*—Duane S. Smith
*Attorney, Agent, or Firm*—W. F. Fasse; W. G. Fasse

[57] ABSTRACT

An apparatus for cleaning hydraulic fluid includes a centrifugal fluid-spinning disk arranged in a housing, of which an upper portion forms a vapor chamber and a lower portion forms a fluid collecting basin. A vacuum pump is connected to the housing through an oil mist separator, such that water vapor is vacuumed away and hydraulic fluid collects in the oil mist separator to then be pumped away. The apparatus further includes preferably a single container that contains both the contaminated hydraulic fluid that is to be cleaned and the cleaned hydraulic fluid. A flexible inlet line and a flexible outlet line with respective hydraulic quick connectors are provided to connect the apparatus and particularly the oil container to a hydraulic system of an aircraft, for example. A high pressure pump connected to the outlet line pumps the cleaned hydraulic fluid into the aircraft hydraulic system and a pressure maintaining valve in the inlet line maintains the system pressure. The apparatus is embodied as a self-contained and self-sufficient mobile unit mounted on wheels. With this apparatus, the hydraulic fluid in the hydraulic system of an aircraft can be cleaned directly plane-side, and it is unnecessary to provide an exchange quantity of hydraulic fluid.

20 Claims, 2 Drawing Sheets

APPARATUS FOR CLEANING A HYDRAULIC FLUID

FIELD OF THE INVENTION

The invention relates to an apparatus for cleaning a hydraulic fluid using a centrifugal disk arrangement for centrifugally spinning the hydraulic fluid such that water vapor and the like can be separated from the hydraulic fluid by using a vacuum pump.

BACKGROUND INFORMATION

Hydraulic fluids used in the hydraulic systems of aircraft, for example, have the tendency to collect and become contaminated with various pollutants and damaging impurities, especially including water and corrosive substances dissolved therein. Such pollutants or contaminants can lead to damage, and particularly corrosion damage, within the respective corresponding hydraulic system in which the hydraulic fluid is used. Therefore, it is necessary that the hydraulic fluid used in such hydraulic systems must be replaced or cleaned to remove these contaminants at certain maintenance time intervals. For convenience, such hydraulic fluid is sometimes referred to simply as hydraulic oil herein.

In order to carry out such a cleaning of the hydraulic oil, stationary apparatus or equipment is typically used. As a consequence, it is necessary to remove from the respective hydraulic system the dirty or contaminated oil that is to be cleaned, carry the dirty oil to the cleaning apparatus located away from the respective hydraulic system, and then after the cleaning operation it is necessary to return the cleaned oil into the hydraulic system.

An apparatus of this known type is described in U.S. Pat. No. 4,604,109, the disclosure of which is incorporated herein by reference. An essential element in the known apparatus is a centrifugal disk arrangement that centrifugally spins the oil so that the water dissolved within the oil can again be extracted therefrom, while damaging particles are simultaneously removed from the oil by means of suitable filters. In the known apparatus, the dirty hydraulic fluid or oil that is to be cleaned is supplied to the centrifugal disk through a central supply arrangement. A vacuum pump is connected to the upper portion of the housing of the centrifugal disk arrangement, so as to evaporate, extract and suck-away water vapor out of the oil, while the bottom portion of the centrifugal disk housing forms a collecting basin for collecting the cleaned hydraulic fluid. Furthermore, the known apparatus includes one container for the contaminated or dirty hydraulic fluid that is to be cleaned, and one container for the cleaned hydraulic fluid.

In using the above described known apparatus for cleaning the hydraulic oil of an aircraft hydraulic system, it is necessary to constantly maintain or store a corresponding quantity of intact oil for carrying out an exchange of the oil, in order to avoid an undesirably long ground time of the aircraft while carrying out the oil cleaning operation. However, in carrying out such a process, a portion of the contaminated or dirty oil will always remain in the hydraulic cylinders of the corresponding hydraulic system, and can thus not be processed for cleaning. As a result, a certain quantity of contaminated oil, and the corresponding contaminants, remain in the hydraulic system of the aircraft even after the oil cleaning procedure has been completed. Moreover, as a further disadvantage, the known apparatus and the method of operating it are inconvenient because the necessary cleaning step cannot be carried out directly at or adjacent to the aircraft.

SUMMARY OF THE INVENTION

In view of the above, it is the aim of the invention to provide an apparatus and a method for cleaning a hydraulic fluid that avoids the problems and disadvantages of the prior art as discussed above. Particularly, it is an object of the invention to provide an apparatus as a self-contained and self-sufficient unit that can carry out the cleaning of the hydraulic fluid directly on location, for example directly plane-side. It is a further object of the invention to provide an apparatus with which, in principle, essentially all of the hydraulic fluid in the respective hydraulic system, including the quantity of hydraulic fluid located in the hydraulic cylinders of the hydraulic system, may be reached and removed for cleaning.

The above objects have been achieved in an apparatus for cleaning a hydraulic fluid according to the invention, including a centrifugal disk arrangement, a vacuum pump connected to an upper portion of a housing of the centrifugal disk arrangement through an oil mist separator, a pump for pumping the collected hydraulic fluid from the oil mist separator, an oil collecting basin formed in a bottom portion of the housing of the centrifugal disk arrangement, and preferably a single oil container for containing both the contaminated oil that is to be cleaned and the cleaned oil. The present apparatus further includes a flexible inlet line and a flexible outlet line connected to the oil container, with respective hydraulic quick connectors provided on ends of the inlet and outlet lines for removably connecting the apparatus to the hydraulic system of an aircraft. A high pressure pump is provided to pump the hydraulic fluid from the apparatus into the hydraulic system of the aircraft, and a pressure holding valve is arranged in the return flow circuit for the hydraulic fluid flowing from the aircraft hydraulic system into and through the present apparatus. Overall, the apparatus is embodied as a mobile unit mounted on wheels so that it can be moved to a plane-side location for conveniently carrying out the oil cleaning procedure in a continuous flow-through manner, rather than a batch manner, while connected to the aircraft hydraulic system.

A particular advantage of the present apparatus is that the hydraulic fluid is cleaned while flowing in a circuit with and connected to the hydraulic system of the aircraft. Thus, it is not necessary to remove from the hydraulic system an entire quantity of contaminated hydraulic fluid that is to be cleaned, it is not necessary to carry the contaminated fluid to cleaning apparatus at a location removed from the aircraft, and it is not necessary to provide and maintain an exchange quantity or replacement quantity of hydraulic fluid.

The present apparatus may further include a hand pump with a non-return valve for regulating the fill level of hydraulic fluid in the hydraulic system of the aircraft, as well as a drain valve for draining hydraulic fluid from the hydraulic system of the aircraft. As a further detail, the upper portion or chamber within the housing of the centrifugal disk arrangement can be connected to an air inlet through a diaphragm and an inlet filter, to selectively or controllably provide an air flow to be suctioned off by the vacuum pump. Furthermore, the vacuum pump may be used to convey the contaminated hydraulic fluid that is to be cleaned. Both the vacuum pump and the oil pump that pumps away the hydraulic fluid collected by the oil mist separator are pump means that contribute to conveying the fluid, and are especially driven by the same motor.

The apparatus preferably comprises a substructure or base in the form of a wagon or trailer mounted on at least two wheels, with an equipment unit mounted on the base. The equipment unit is a completely self-sufficient and self-contained unit that includes all functional components as well as operating elements and monitoring elements for carrying out the hydraulic fluid cleaning process.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
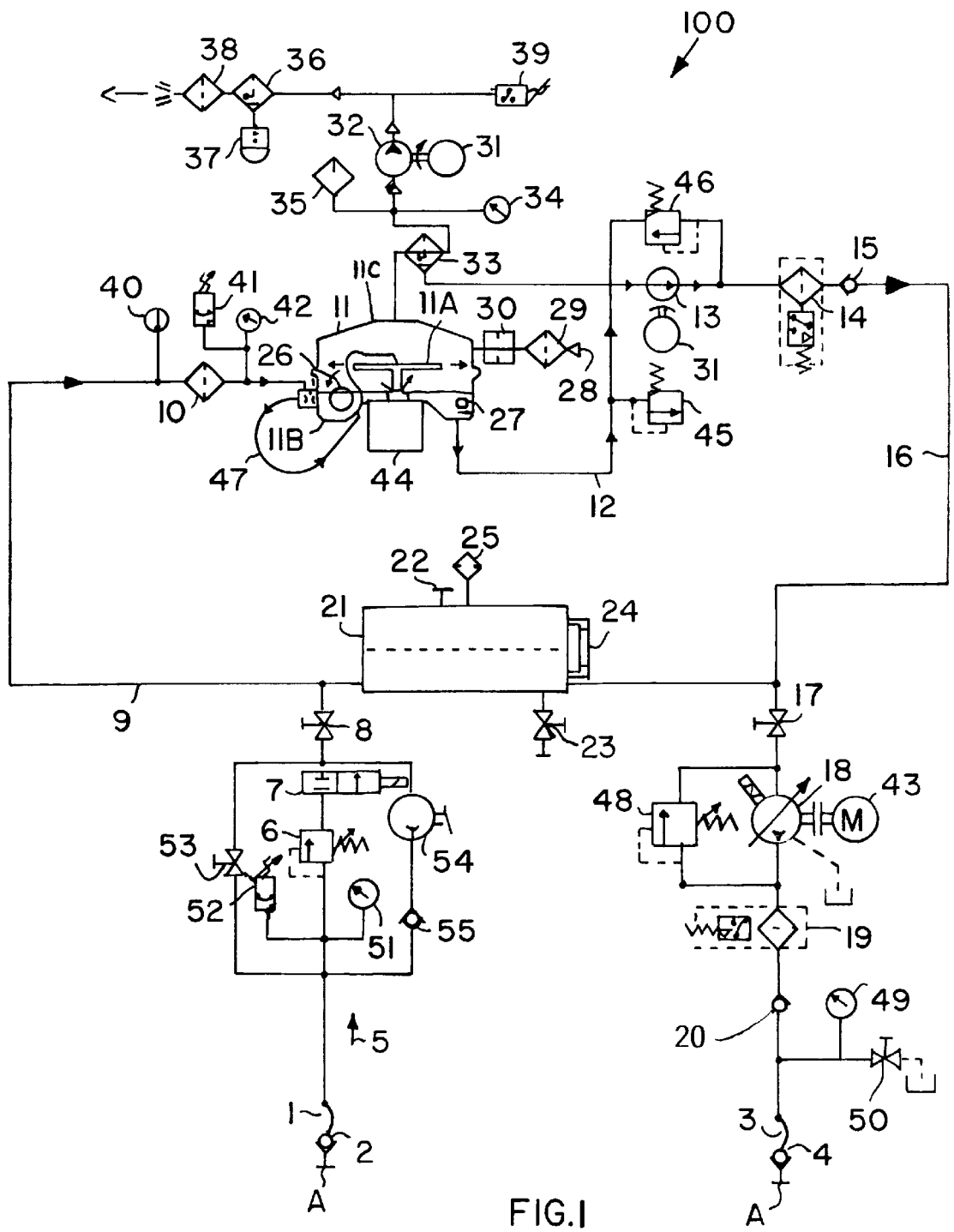
FIG. 1 is a schematic hydraulic circuit diagram of an apparatus for cleaning hydraulic fluid according to the invention.

FIG. 1 shows a hydraulic circuit diagram of the essential components of an example embodiment of an apparatus 100 for cleaning hydraulic fluid according to the invention. The present apparatus 100 includes a flexible inlet line 1 having a hydraulic quick connector 2 at an end thereof, and a flexible outlet line 3 with a hydraulic quick connector 4 at an end thereof, for connecting the apparatus 100 to the hydraulic system of an aircraft A which is not shown.

When considered in the direction of fluid flow represented by arrow 5, the internal hydraulic flow circuit of the apparatus 100 essentially includes the following components or stations interconnected in sequence with one another: a pressure holding or maintaining valve 6, a magnetic valve 7, an inlet shut-off valve 8, an internal inlet line or first conduit 9, a wire mesh screen 10, a centrifugal disk arrangement 11, an internal connector line or intermediate line 12, a pressure controlled valve 45 interposed in the line 12, a fluid conveyor pump 13, a pressure controlled valve 46 connecting the line 12 downstream from the pump 13, a particle filter 14, a non-return valve 15, an internal outlet line or second conduit 16, an outlet shut-off valve 17, a high pressure pump 18, an outlet filter arrangement 19, and an outlet valve 20. The above mentioned flexible inlet line 1 is connected to the pressure holding valve 6, while the flexible outlet line 3 is connected to the outlet valve 20. The outlet valve 20 may for example be or include a non-return valve.

The apparatus 100 further comprises an oil container 21 that is connected to both the internal inlet line 9 and the internal outlet line 16. Thus, the oil container 21 will receive and contain both contaminated hydraulic oil and cleaned hydraulic oil, as explained in detail below. The oil container 21 includes a filling neck or port 22, a drain valve 23, a fill level indicator 24, and an air vent 25.

The cleaning means for removing contaminants from the hydraulic oil preferably include a centrifugal disk arrangement 11 for removing volatile contaminants, and can further include mechanical filters for removing particulate contaminants, and may include vapor or chemical adsorption or absorption compounds for removing vapor and chemical contaminants. As an alternative to the centrifugal disk arrangement, any other known means for forming fine droplets of the contaminated oil and removing volatile contaminants therefrom could be used, such as oil mist spray nozzles arranged in a vacuum chamber.

In the preferred embodiment, the centrifugal disk arrangement 11 includes at least one centrifugal disk 11A rotation- ally driven by a motor 44 and arranged in a housing including a bottom portion 11B and an upper portion 11C. The hydraulic oil is delivered through a line 47, controlled by a float valve 26, onto the disk 11A. The bottom portion 11B of the housing forms a collecting basin for collecting the oil that is centrifugally spun off of the disk 11A, and comprises the float valve 26 and a level switch 27. The upper portion 11C of the housing of the centrifugal disk arrangement 11 forms an air chamber, into which air enters through an air inlet 28, an inlet filter 29, and diaphragm 30. In order to provide a pressure drop, i.e. a vacuum within the upper portion 11C of the housing, a vacuum pump 32 driven by a motor 31 sucks the air out of the housing through an oil mist separator 33. The oil that collects in the oil mist separator 33 is sucked out by the pump 13, which is driven by the same motor 31 as the vacuum pump 32, in the illustrated embodiment, as indicated by the common use of reference number 31 for the motor of the pump 13 and the motor of the pump 32. For example, the two pumps 13 and 32 can be mounted on a common shaft, or driven by mechanical gear trains from the same motor 31.

A vacuum gage 34 and an oiler 35 are connected to a conduit interposed and connected between the oil mist separator 33 and the vacuum pump 32. The air exiting the vacuum pump 32 on the pressure side thereof flows through a downstream-arranged outlet filter group including a water separator 36 with a collecting container 37 and an outlet filter 38. After passing through the outlet filter 38, the air can be discharged to the outside atmosphere. Furthermore, a pressure switch 39 is connected to the pressure side or outlet of the vacuum pump 32. As further accessories, an inlet thermometer 40 is arranged upstream (with respect to the oil flow direction) from the wire mesh screen 10. A vacuum switch 41 and an inlet manometer 42 are connected downstream (with respect to the oil flow direction) from the wire mesh screen 10.

If the apparatus 100 is to be used to clean the hydraulic oil in the hydraulic system of an aircraft A, then the apparatus 100 is connected to the hydraulic system of the aircraft via the quick connectors 2 and 4. Then, the motor 31 for the pumps 13 and 32, a motor 43 for the high pressure pump 18, and the motor 44 of the centrifugal disk arrangement 11 are actuated and set into motion. As a result, due to the operation of the vacuum pump 32, a nearly constant quantity or flow rate of oil is removed from the oil container 21, directed through the centrifugal disk arrangement 11, and then back to the oil container 21 through the oil line 16. Moreover, due to the operation of the high pressure pump 18, a certain quantity or flow rate of oil, and specifically the cleaned oil from the oil line 16, is pumped through the quick connector 4 into the hydraulic system of the aircraft. A corresponding quantity of oil is pushed through the hydraulic system of the aircraft and then through the quick connector 2 and the opened shut-off valve 8 to flow back into the oil container 21. Thus, the oil in the container 21 provides oil to two oil flow circuits or circuit loops, namely an internal flow circuit through the centrifugal disk arrangement 11 and an external flow circuit through the hydraulic system of the aircraft A.

The oil is cleaned as it flows through the internal flow circuit, whereby the flow of oil from the container 21 to the centrifugal disk arrangement 11 is achieved or driven by the vacuum created by the vacuum pump 32. The optimum through-flow velocity or flow rate of oil for the centrifugal disk arrangement 11 is controlled and determined by the through-flow permeability of the particular wire mesh screen 10. The wire mesh screen 10 may be configured and may be exchangeable as necessary to achieve the desired flow rate.

In this context, the quantity of oil supplied through the line 47 onto the spinning disk 11A is regulated by the float valve 26 dependent upon the respective oil level in the bottom portion 11B of the centrifugal disk housing in such a manner that a drop in the oil level opens the valve 26 while an increase of the oil level closes the valve 26. The level switch 27 provides a safety function in that it switches off the apparatus in the event that the supply flow of oil to the centrifugal disk arrangement 11 is interrupted for some reason and the lower portion 11B of the housing would be emptied of oil by the operation of the vacuum pump 32.

The oil is directed to flow onto the centrifugal disk 11A such that the oil is centrifugally flung outwardly in the form of very fine droplets through the air chamber formed in the upper portion 11C of the housing of the centrifugal disk arrangement 11. Due to the vacuum created by the vacuum pump 32, the water and other volatile liquids that are dissolved, suspended, or mixed in the oil are vaporized and sucked out through the oil separator 33 by the vacuum pump 32, and are ultimately directed through the water separator 36 whereafter the air is exhausted out through the air outlet 38. The oil that collects in the oil separator 33 is pumped out by the pump 13 through the particle filter 14 to remove damaging particulate contaminants, and then the cleaned oil, from which water, other volatile liquids, and particles have been removed, is returned through the line 16 back into the container 21.

As described above, through the operation of the internal flow circuit, contaminated oil is continuously removed from the oil container 21 and is then returned to the container 21 in the form of cleaned oil. As a result, the degree of purity of the oil contained in the container 21 increases with increasing operation time of the cleaning process. That is to say, the cleaned oil is not separated from the contaminated oil in the container 21. Instead, to at least some extent, the cleaned oil and the contaminated oil mix in the container 21 to form a partially contaminated mixed oil that becomes ever cleaner as the apparatus operates. Preferably, the oil flow rate of the high pressure pump 18 is less than, or only a portion of, the oil flow rate through the pump 13. Thus, there is no back-flow of contaminated oil from the internal inlet line 9 back through the tank 21 and the valve 17 to the high pressure pump 18, so that only cleaned oil is circulated to the hydraulic system of the aircraft. Alternatively, the flow rate of the high pressure pump may be equal to or even greater than the flow rate of the circulating pump 13, whereby mixed or partially contaminated oil may be pumped into the hydraulic system.

Moreover, the oil container 21 acts as a buffer or gradient between the cleaned oil line 16 and the contaminated oil line 9, while the degree of contamination of the oil in the tank 21 and the oil in the line 9 is continuously reduced by operation of the cleaning process. Through the external flow circuit, the cleaned oil provided through the outlet line 3 flows through the hydraulic system of the aircraft A and correspondingly displaces and moves a similar quantity of contaminated oil back into the oil line 9 and possibly into the oil container 21 depending on relative flow rates.

A safety valve 48 is connected in parallel with, and bridging across, the high pressure pump 18 so as to limit the pressure on the pressure outlet side of the pump 18 to a maximum acceptable value. The power of the high pressure pump 18 is sufficient to provide the cleaned oil at a pressure corresponding to the operating pressure of the various hydraulic elements such as hydraulic cylinders and hydraulic motors in the aircraft. Thus, these hydraulic elements can be operated under pressure simulating operating conditions, so that the hydraulic oil contained within these hydraulic elements can also be circulated and thus replaced with cleaned oil during the cleaning process.

The hydraulic system of the aircraft operatively includes an oil reservoir having the effect of a pressure reservoir that maintains in the hydraulic system a pre-pressure level that is dependent upon the oil level present in this reservoir. An inlet manometer 49 is connected between the output side of the high pressure pump 18 and the quick connector 4, such that this manometer 49 can monitor the oil pressure prevailing within the aircraft hydraulic system on the high pressure side. Furthermore, a drain valve 50 is provided between the high pressure pump 18 and the quick connector 4 in order to remove oil from the external flow circuit. The oil pumped into the aircraft hydraulic system through the quick connector 4 has a pressure on the order of one or more hundred bar, and as a particular example approximately 200 bar on the high pressure side, and after returning through the quick connector 2 still is under the above mentioned pre-pressure. The pressure holding valve 6 is provided in order to maintain in the aircraft hydraulic system the pre-pressure, which is approximately 2 bar higher than the operating pressure of the internal flow circuit of the apparatus 100 during the cleaning process.

An outlet manometer 51 is provided between the quick connector 2 and the valve 8 in order to monitor the pressure of the oil coming in through the quick connector 2. The pressure also acts upon a pressure switch 52 connected adjacent the manometer 51, as a part of a safety circuit. A bridging valve or drain valve 53 is connected in parallel to, and bridging across, the pressure holding valve 6 and the magnetic valve 7. Moreover, a hand pump 54 with a non-return valve 55 are connected in parallel to and across the drain valve 53. By using this hand pump 54, the quantity of oil present within the aircraft hydraulic system can be supplemented or "topped off" with oil from the container 21. On the other hand, an oil level surplus in the aircraft hydraulic system can be diminished by opening the drain valve 53 to allow oil to flow back from the aircraft hydraulic system into the oil container 21 under the effect of the hydraulic system pre-pressure. If the quantity of oil to be received in the container 21 is greater than the volume capacity of the container 21, then the excess quantity of oil can be drained from the drain valve 50.

Figure 2:
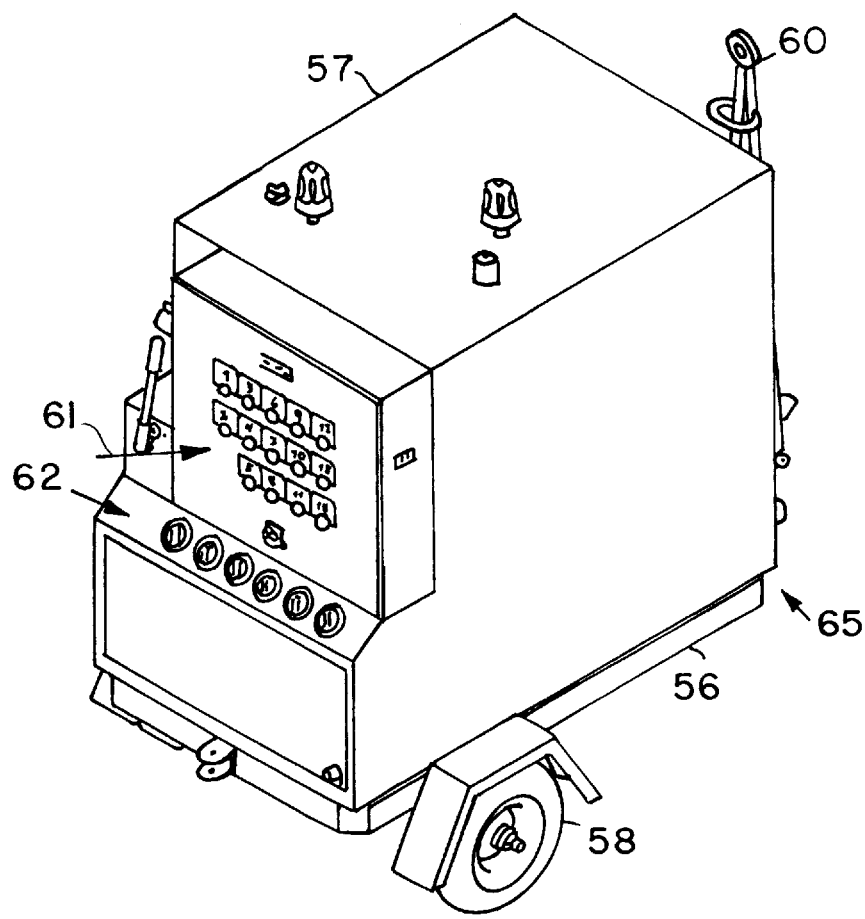
FIG. 2 is a perspective external view of an apparatus for cleaning hydraulic fluid according to the invention, embodied as a self-sufficient, self-contained mobile equipment unit.

FIG. 2 is a representative perspective view of an apparatus according to the invention embodied as a completely self-sufficient and self-contained mobile unit including an equipment unit 57 mounted on a substructure or base 56. The base 56 is preferably in the form of a trailer or wagon base having at least two wheels 58 and a standardized tractor hitch 60. The equipment unit 57 includes all of the functional elements of the present inventive apparatus 100 as discussed in relation to FIG. 1.

Generally, the equipment unit 57 includes all operating elements 61 for operating the apparatus, e.g. for selecting appropriate valve positions and the like, and all necessary monitoring elements 62 for monitoring the operation of the apparatus, e.g. for monitoring the above described pressure gages, manometers, thermometer, etc.

The equipment unit 57 further includes a self-contained power unit 65, which may for example include an electrical generator driven by a gasoline powered engine, whereby the motors 31, 43 and 44 are electric motors driven by the electric power provided by the electric generator. Alternatively, the power unit may include a self-contained hydraulic power circuit with a hydraulic pump to drive corresponding hydraulic motors 31, 43 and 44, or a direct mechanical transmission to drive the motors 31, 43 and 44. With the self-contained embodiment of FIG. 2, the apparatus according to the invention can be moved to a convenient location directly adjacent the aircraft, and may then be connected to the hydraulic system of the aircraft by the flexible inlet and outlet lines 1 and 3, to conveniently carry out the oil-cleaning process while the apparatus is connected to the aircraft hydraulic system at a location directly planeside.

Although the invention has been described with reference to specific example embodiments, it will be appreciated that it is intended to cover all modifications and equivalents within the scope of the appended claims. It should further be understood that the present disclosure extends to all combinations of any elements recited in any of the appended claims.

What is claimed is:

1. An apparatus for cleaning a contaminated hydraulic fluid in a hydraulic system to provide a cleaned hydraulic fluid, said apparatus comprising:
   a fluid container adapted to receive and contain the contaminated hydraulic fluid and the cleaned hydraulic fluid,
   a flexible inlet line connected to said fluid container and having an inlet end adapted to be removably connected to the hydraulic system to flow the contaminated hydraulic fluid from the hydraulic system,
   a flexible outlet line connected to said fluid container and having an outlet end adapted to be removably connected to the hydraulic system to flow the cleaned hydraulic fluid to the hydraulic system,
   a centrifugal disk arrangement including a housing and at least one rotatable centrifugal disk arranged in said housing,
   a contaminated fluid line connecting said fluid container with said centrifugal disk arrangement,
   a vacuum pump connected to said housing of said centrifugal disk arrangement for vapor flow therefrom,
   a hydraulic fluid mist separator interposed and connected between said housing of said centrifugal disk arrangement and said vacuum pump,
   a hydraulic fluid pump with a suction port connected to said hydraulic fluid mist separator and a pressure port,
   a cleaned fluid line connecting said pressure port of said hydraulic fluid pump with said fluid container,
   a high pressure pump connected and interposed between said fluid container and said flexible outlet line and adapted to pump the cleaned hydraulic fluid through said flexible outlet line to the hydraulic system, and
   a pressure maintaining valve connected and interposed between said flexible inlet line and said fluid container.

2. The apparatus according to claim 1, wherein said housing of said centrifugal disk arrangement includes a bottom portion forming a fluid collecting basin for cleaned hydraulic fluid, and further comprising a conduit connecting said fluid collecting basin to said pressure port of said hydraulic fluid pump.

3. The apparatus according to claim 1, further comprising first and second quick connectors respectively attached to said inlet end of said inlet line and said outlet end of said outlet line, and respectively adapted to be removably connected to the hydraulic system.

4. The apparatus according to claim 1, further comprising at least two wheels provided at a bottom of said apparatus, such that said apparatus is a mobile unit.

5. The apparatus according to claim 1, including a total of only one said fluid container that is adapted and connected in said apparatus so as to receive and contain both the contaminated hydraulic fluid and the cleaned hydraulic fluid without separation between the contaminated hydraulic fluid and the cleaned hydraulic fluid.

6. The apparatus according to claim 1, further comprising a hand-operable pump and a non-return valve connected in series with one another either between said fluid container and said inlet line or between said fluid container and said outlet line, wherein said hand operable pump is arranged and adapted to pump the hydraulic fluid into the hydraulic system, and further comprising a drain valve connected either between said fluid container and said inlet line or between said fluid container and said outlet line and adapted to drain the hydraulic fluid from the hydraulic system.

7. The apparatus according to claim 6, wherein said hand-operable pump and said non-return valve connected in series with one another, and said drain valve, are respectively connected in parallel with and bridging across said pressure maintaining valve.

8. The apparatus according to claim 1, further comprising an air inlet, an air filter, and a diaphragm arranged in series with one another and connected to said housing of said centrifugal disk arrangement.

9. The apparatus according to claim 1, wherein said vacuum pump is adapted to create in said housing a vacuum which acts to convey the contaminated hydraulic fluid through the contaminated fluid line into the centrifugal disk arrangement.

10. The apparatus according to claim 1, further comprising a single common drive motor operatively connected for drive transmission to said vacuum pump and to said hydraulic fluid pump.

11. The apparatus according to claim 1,
    further comprising at least one operating selection input element, at least one operating status indicator, and a base including at least two wheels,
    wherein said fluid container, said inlet line, said outlet line, said centrifugal disk arrangement, said contaminated fluid line, said vacuum pump, said hydraulic fluid mist separator, said hydraulic fluid pump, said cleaned fluid line, said high pressure pump, and said pressure maintaining valve are mounted on said base,
    such that said apparatus is a self-contained and self-sufficient mobile unit.

12. The apparatus according to claim 1,
    wherein said housing of said centrifugal disk arrangement includes a bottom portion forming a fluid collecting basin for cleaned hydraulic fluid,
    further comprising a conduit connecting said fluid collecting basin to said pressure port of said hydraulic fluid pump,
    further comprising first and second quick connectors respectively attached to said inlet end of said inlet line and said outlet end of said outlet line, and respectively adapted to be removably connected to the hydraulic system, and
    further comprising at least two wheels provided at a bottom of said apparatus, such that said apparatus is a mobile unit.

13. The apparatus according to claim 1, wherein said contaminated fluid line is connected to a first end of said fluid container, said flexible inlet line is connected to said contaminated fluid line and is thereby connected to said first end of said fluid container, said cleaned fluid line is connected to a second end of said fluid container opposite said first end, and said flexible outlet line is connected to said cleaned fluid line and is thereby connected to said second end of said fluid container.

14. The apparatus according to claim 1, wherein said hydraulic fluid pump and said high pressure pump are respectively configured and adapted so that said hydraulic fluid pump delivers a higher fluid flow rate than said high pressure pump.

15. The apparatus according to claim 1, further comprising a wire mesh screen interposed in said contaminated fluid line between said fluid container and said centrifugal disk arrangement, a particle filter interposed in said cleaned fluid line, and an outlet fluid filter interposed between said fluid container and said outlet end of said outlet line.

16. The apparatus according to claim 1, further comprising a vacuum gauge interposed between said vacuum pump and said housing of said centrifugal disk arrangement, a vacuum manometer interposed in said contaminated fluid line, an inlet thermometer interposed in said contaminated fluid line, a supply pressure gauge interposed between said high pressure pump and said outlet end of said outlet line, and a return pressure gauge interposed between said inlet end of said inlet line and said pressure maintaining valve.

17. An apparatus for cleaning a hydraulic fluid of a hydraulic system, said apparatus comprising:
   a fluid container adapted to receive and contain a quantity of the hydraulic fluid,
   fluid cleaning means for removing contaminants from the hydraulic fluid,
   a first conduit connecting said fluid container to said fluid cleaning means,
   a second conduit connecting said fluid cleaning means to said fluid container,
   pump means interposed in said first conduit or in said second conduit and adapted to convey the hydraulic fluid in sequence from the fluid container, through the first conduit, through the fluid cleaning means, through the second conduit and into the fluid container,
   an outlet line connected to said second conduit and having an outlet end adapted to be removably connected to the hydraulic system,
   an inlet line connected to said first conduit and having an inlet end adapted to be removably connected to the hydraulic system,
   a high pressure pump interposed in said outlet line and adapted to pump the hydraulic fluid from said second conduit, through said outlet line, through said outlet end, and into the hydraulic system, and
   a pressure maintaining valve interposed in said inlet line and adapted to selectively restrict a flow of the hydraulic fluid through said inlet line to maintain a pressure in the hydraulic system.

18. The apparatus according to claim 17, wherein
   said fluid cleaning means comprise first means for removing volatile contaminants from the hydraulic fluid and second means for removing particulate contaminants from the hydraulic fluid,
   said pump means comprise a vacuum pump connected to a vapor chamber of said first means and a hydraulic fluid circulation pump interposed in said second conduit, and the apparatus is a self-contained, self-sufficiently operable mobile unit.

19. A method of cleaning a hydraulic fluid of a hydraulic system using an apparatus including a fluid container, a contaminant removal device, and a circulation pump connected in series with said fluid container and said contaminant removal device to form a circulation loop, a high pressure pump in an outlet line branching off from said circulation loop on an upstream side of said fluid container, and a pressure regulating valve in an inlet line branching off from said circulation loop on a downstream side of said fluid container, said method comprising the following steps:
   (a) connecting said inlet line to a first port of said hydraulic system, and connecting said outlet line to a second port of said hydraulic system;
   (b) after said step (a) and while said inlet line and said outlet line are respectively connected to said first and second ports of said hydraulic system, operating said circulation pump to circulate said hydraulic fluid around said circulation loop from said fluid container through said contaminant removal device and back into said fluid container; and
   (c) during said step (b), operating said high pressure pump to pressurize said hydraulic fluid to a hydraulic system pressure and pump said hydraulic fluid through said outlet line, into said second port, into and through said hydraulic system, out of said second port and through said inlet line at said hydraulic system pressure, wherein said pressure regulating valve maintains said hydraulic system pressure at a pressure level higher than a cleaning apparatus pressure present within said circulation loop.

20. The method according to claim 19,
   wherein said step of circulating hydraulic fluid around said circulation loop comprises circulating contaminated hydraulic fluid from said fluid container through said contaminant removal device so as to clean said contaminated hydraulic fluid to provide cleaned hydraulic fluid, and then circulating said cleaned hydraulic fluid back into said fluid container to form a partially-contaminated mixed hydraulic fluid therein, so that a degree of contamination of said partially-contaminated mixed hydraulic fluid is continuously reduced while carrying out said step of circulating hydraulic fluid around said circulation loop,
   wherein said pressurizing and pumping hydraulic fluid in said step (c) comprises pumping said cleaned hydraulic fluid into and through said hydraulic system, wherein said hydraulic system pressure is at least about equal to a normal operating pressure of said hydraulic system, and returning contaminated hydraulic fluid from said hydraulic system into said inlet line, and
   wherein said hydraulic system includes hydraulically actuatable components selected from hydraulic cylinders and hydraulic motors, and said method further comprises operating said hydraulically actuatable components during said step (c).

* * * * *